United States Patent
Aaron et al.

(10) Patent No.: US 7,761,705 B2
(45) Date of Patent: *Jul. 20, 2010

(54) DETECTION OF ENCRYPTED PACKET STREAMS

(75) Inventors: Jeffrey A. Aaron, Atlanta, GA (US); Edgar Vaughan Shrum, Jr., Smyrna, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1388 days.

This patent is subject to a terminal disclaimer.

(21) Appl. No.: 10/944,229

(22) Filed: Sep. 17, 2004

(65) Prior Publication Data

US 2006/0064579 A1 Mar. 23, 2006

(51) Int. Cl.
*H04L 29/06* (2006.01)
(52) U.S. Cl. .................. 713/160; 713/151; 713/153; 726/12; 726/13; 380/255
(58) Field of Classification Search ................ 713/150, 713/151, 153, 160; 726/12, 13; 380/255
See application file for complete search history.

(56) References Cited

U.S. PATENT DOCUMENTS

| | | | | |
|---|---|---|---|---|
| 5,706,406 | A * | 1/1998 | Pollock | 706/51 |
| 6,522,658 | B1 | 2/2003 | Roccanova | |
| 6,640,248 | B1 * | 10/2003 | Jorgensen | 709/226 |
| 6,651,099 | B1 * | 11/2003 | Dietz et al. | 709/224 |
| 6,665,725 | B1 * | 12/2003 | Dietz et al. | 709/230 |
| 6,771,646 | B1 * | 8/2004 | Sarkissian et al. | 370/392 |
| 6,789,116 | B1 * | 9/2004 | Sarkissian et al. | 709/224 |
| 6,954,789 | B2 * | 10/2005 | Dietz et al. | 709/224 |
| 6,961,331 | B2 * | 11/2005 | Tokunaga et al. | 370/352 |
| 6,973,033 | B1 * | 12/2005 | Chiu et al. | 370/230.1 |
| 6,975,592 | B1 * | 12/2005 | Seddigh et al. | 370/230 |
| 7,010,687 | B2 * | 3/2006 | Ichimura | 713/167 |
| 7,035,289 | B2 * | 4/2006 | Devine et al. | 370/493 |
| 7,215,637 | B1 * | 5/2007 | Ferguson et al. | 370/230.1 |
| 7,216,230 | B2 * | 5/2007 | Suzuki et al. | 713/170 |
| 7,246,245 | B2 * | 7/2007 | Twomey | 713/189 |
| 7,286,667 | B1 * | 10/2007 | Ryal | 380/200 |
| 7,299,282 | B2 * | 11/2007 | Sarkissian et al. | 709/224 |
| 7,310,423 | B2 * | 12/2007 | Hobrock et al. | 380/241 |
| 7,336,787 | B2 * | 2/2008 | Unger et al. | 380/217 |
| 7,359,979 | B2 * | 4/2008 | Gentle et al. | 709/231 |
| 7,447,313 | B2 * | 11/2008 | Van Rijnsoever | 380/207 |
| 7,451,309 | B2 * | 11/2008 | Aaron et al. | 713/160 |
| 2001/0023484 | A1 * | 9/2001 | Ichimura | 713/193 |
| 2002/0027923 | A1 * | 3/2002 | Tokunaga et al. | 370/401 |
| 2002/0035639 | A1 | 3/2002 | Xu | |
| 2002/0059170 | A1 | 5/2002 | Vange | |
| 2002/0075805 | A1 * | 6/2002 | Gupta et al. | 370/235 |
| 2002/0075875 | A1 * | 6/2002 | Dravida et al. | 370/395.21 |
| 2002/0094081 | A1 * | 7/2002 | Medvinsky | 380/44 |

(Continued)

*Primary Examiner*—David García Cervetti
(74) *Attorney, Agent, or Firm*—Myers Bigel Sibley & Sajovec (57) ABSTRACT

Methods, systems, and products are disclosed for detecting encrypted packet streams. One method notes an observable parameter of an encrypted stream of packets. The parameter is observable despite encryption obscuring the contents of the encrypted stream of packets. The type of data within the encrypted stream of packets is inferred from the observable parameter, wherein, despite the encryption, the type of data within the encrypted stream of packets may be inferred.

23 Claims, 10 Drawing Sheets

U.S. PATENT DOCUMENTS

| | | | |
|---|---|---|---|
| 2002/0095577 A1* | 7/2002 | Nakamura et al. | 713/176 |
| 2002/0105911 A1* | 8/2002 | Pruthi et al. | 370/241 |
| 2003/0016770 A1 | 1/2003 | Trans | |
| 2003/0021296 A1* | 1/2003 | Wee et al. | 370/474 |
| 2003/0023846 A1* | 1/2003 | Krishna et al. | 713/162 |
| 2003/0043801 A1* | 3/2003 | Seko | 370/389 |
| 2003/0068040 A1* | 4/2003 | Wee et al. | 380/200 |
| 2003/0086411 A1 | 5/2003 | Vassilovski | |
| 2003/0086515 A1 | 5/2003 | Trans | |
| 2003/0097595 A1* | 5/2003 | Partridge et al. | 713/201 |
| 2003/0131228 A1* | 7/2003 | Twomey | 713/153 |
| 2003/0167394 A1* | 9/2003 | Suzuki et al. | 713/168 |
| 2003/0227907 A1* | 12/2003 | Choi et al. | 370/352 |
| 2003/0231767 A1* | 12/2003 | Carbajal | 380/200 |
| 2003/0235209 A1 | 12/2003 | Garg | |
| 2004/0003070 A1* | 1/2004 | Fernald et al. | 709/223 |
| 2004/0008724 A1* | 1/2004 | Devine et al. | 370/466 |
| 2004/0068668 A1* | 4/2004 | Lor et al. | 713/201 |
| 2004/0071130 A1* | 4/2004 | Doerr et al. | 370/352 |
| 2004/0083299 A1* | 4/2004 | Dietz et al. | 709/230 |
| 2004/0090937 A1 | 5/2004 | Chaskar | |
| 2004/0090943 A1 | 5/2004 | da Costa | |
| 2004/0090989 A1 | 5/2004 | Kobayashi | |
| 2004/0109414 A1* | 6/2004 | Choi et al. | 370/230 |
| 2004/0142697 A1* | 7/2004 | Knaebchen et al. | 455/452.1 |
| 2004/0199630 A1* | 10/2004 | Sarkissian et al. | 709/224 |
| 2004/0208120 A1* | 10/2004 | Shenoi | 370/229 |
| 2004/0215955 A1* | 10/2004 | Tamai et al. | 713/150 |
| 2004/0234056 A1* | 11/2004 | Heilmann et al. | 379/196 |
| 2004/0247122 A1* | 12/2004 | Hobrock et al. | 380/241 |
| 2004/0258090 A1* | 12/2004 | Sharafeddine et al. | 370/468 |
| 2004/0260829 A1* | 12/2004 | Husak et al. | 709/232 |
| 2005/0052996 A1* | 3/2005 | Houck et al. | 370/230 |
| 2005/0060539 A1* | 3/2005 | Anspach | 713/160 |
| 2005/0060543 A1* | 3/2005 | Anspach | 713/165 |
| 2005/0120208 A1* | 6/2005 | Albert Dobson | 713/160 |
| 2006/0031374 A1* | 2/2006 | Lu et al. | 709/207 |
| 2006/0064579 A1* | 3/2006 | Aaron et al. | 713/150 |
| 2006/0064746 A1* | 3/2006 | Aaron et al. | 726/13 |
| 2006/0064747 A1* | 3/2006 | Aaron et al. | 726/13 |
| 2006/0064748 A1* | 3/2006 | Aaron et al. | 726/13 |
| 2006/0064749 A1* | 3/2006 | Aaron et al. | 726/13 |
| 2006/0068040 A1* | 3/2006 | Nair | 424/742 |
| 2006/0072464 A1* | 4/2006 | Aaron et al. | 370/241 |
| 2006/0233362 A1* | 10/2006 | Deans et al. | 380/42 |
| 2006/0245589 A1* | 11/2006 | Pinder | 380/42 |
| 2007/0060166 A1* | 3/2007 | Kitamura et al. | 455/450 |

\* cited by examiner

DETECTION OF ENCRYPTED PACKET STREAMS

CROSS-REFERENCE TO RELATED APPLICATIONS

This application relates to the commonly assigned and concurrently filed U.S. applications: Ser. No. 10/944,229, entitled "Detection of Encrypted Packet Streams" Ser. No. 10/943,588, entitled "Signature Specification for Encrypted Packet Streams"; Ser. No. 10/944,294, entitled "Detection of Encrypted Packet Streams" Ser. No. 10/943,589, entitled "Detection of Encrypted Packet Streams Using a Timer"; and Ser. No. 10/943,590, entitled "Detection of Encrypted Packet Streams Using Process Variation and/or Multiple Processes". These commonly-assigned applications are all incorporated by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to communications and, more particularly, to inferring data types in encrypted data streams.

Encryption of communications is increasing. More and more people, businesses, and governments are encrypting their electronic communications. This encryption provides enhanced security and privacy for these electronic communications.

Encryption, however, is a problem for communications service providers. Communications service providers need to know the type of data contained within an electronic communication. Some data types receive priority processing, while other data types are queued for later processing. Encryption, however, hides the contents of the communication and often prevents a communications service provider from determining the level of required processing. Because the communications service provider cannot determine the level of required processing, the encrypted communication defaults to lesser priority and/or processing.

Internet telephony provides an example. Internet telephone calls should be processed to result in a real time, or nearly real time, conversation. If packets are lost, or if packets experience congestion, the quality of the call suffers. Internet telephone calls, then, should receive priority processing. When a communications service provider detects data representing an Internet telephone call, the service provider gives that data priority/special processing to reduce packet loss and to reduce latency effects. Encryption, however, hides the contents of the communication. Encryption prevents the communications service provider from determining whether priority and/or special processing is required. So, even though the communication is an Internet telephone call, encryption causes the communication to default to lesser priority and/or processing. The quality of the call may then suffer from packet loss and congestion.

There is, accordingly, a need in the art for improved determination of data types. When parties encrypt their communications, there is a need for determining the type of data contained inside the encrypted communication. There is also a need for identifying a particular kind of encrypted traffic in order to provide prioritized/specialized processing.

SUMMARY

The aforementioned problems, and other problems, are reduced, according to exemplary embodiments, using methods, computer systems, computer programs, and computer program products that detect the type of data contained within an encrypted stream of packets. According to exemplary embodiments, the existence of one or more parameters of the encrypted stream of packets is noted. The one or more parameters are observable, despite encryption obscuring the contents of the encrypted stream of packets. The observable parameters are then used to infer the type of data contained within the encrypted stream of packets. An inference is then made whether the encrypted stream of packets contains, for example, video data, picture data, text data, and/or or voice data. Because the type of data may be inferred, the encrypted stream of packets may be processed to achieve objectives and goals. That is, even though the contents of the packets are hidden by encryption, this invention can still identify the type of date contained within the packets. The inferred type of data may then be used to determine if additional processing is required.

According to exemplary embodiments, encrypted Internet Protocol packet streams may be detected. An observable parameter of an encrypted stream of packets is noted. The terms "note, "notes," "noted," "noting," and variants may mean, for example, the exemplary embodiments can discern, read, observe, calculate, and/or measure the observable parameter, despite encryption obscuring the contents of the encrypted stream of packets. The type of data within the encrypted stream of packets is inferred from the observable parameter, wherein, despite the encryption, the type of data within the encrypted stream of packets may be inferred.

According to other embodiments, Voice Over Internet Protocol data may be inferred. Here an observable parameter of an encrypted stream of packets is noted. The parameter is observable despite encryption obscuring the contents of the encrypted stream of packets. The observable parameter is compared to a threshold value. Voice Over Internet Protocol data within the encrypted stream of packets is then inferred from the observable parameter. The presence of Voice Over Internet Protocol data may be inferred within the encrypted stream of packets, despite the encryption.

According to an embodiment, a system for inferring Voice Over Internet Protocol data may include a communications module noting an observable parameter of an encrypted stream of packets. The parameter is observable despite encryption obscuring the contents of the encrypted stream of packets. The communications module compares the observable parameter to a threshold value. The communications module infers Voice Over Internet Protocol data within the encrypted stream of packets from the observable parameter. Voice Over Internet Protocol data, within the encrypted stream of packets, may be inferred despite the encryption.

According to another of the embodiments, a computer program product may be used for inferring Voice Over Internet Protocol data. This computer program product includes a communications module stored on a computer-readable medium. The communications module notes an observable parameter of an encrypted stream of packets. The parameter is observable despite encryption obscuring the contents of the encrypted stream of packets. The communications module compares the observable parameter to a threshold value. The communications module infers Voice Over Internet Protocol data within the encrypted stream of packets, despite the encryption.

The exemplary embodiments may also be used to infer other types of data. The exemplary embodiments, for example, may be used to infer the presence of on-line gaming sessions, simulations, virtual reality, email, messaging, multimedia-conferencing, application-sharing, e-voting, groupware & collaboration, and any sort or type of video data. The exemplary embodiments can be applied to any encrypted stream which still contains observable parameters having some correlation to the type of data and/or the type of application/service and/or the specific application/service. The concepts described herein can help not just the type of data or application being used and communicating within the encrypted stream, but the concepts can also help identify the actual vendor-make, model, and version of a software application being used (e.g., Vendor A may use different packet sizes than Vendor B, and version 3 from Vendor A uses different inter-packet timing than version 1 from Vendor A). Whenever an encrypted stream contains observable parameters, the exemplary embodiments described herein exploit any correlation to the observable parameters.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

These and other features, aspects, and advantages of the embodiments of the present invention are better understood when the following Detailed Description is read with reference to the accompanying drawings, wherein.

DETAILED DESCRIPTION

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, the type of data contained within an encrypted stream of packets is detected. In particular, the existence of one or more parameters of the encrypted stream of packets is noted. The one or more parameters are observable, despite encryption obscuring the contents of the encrypted stream of packets. The observable parameters are then used to infer the type of data contained within the encrypted stream of packets, e.g., whether the encrypted stream of packets contains, for example, video data, picture data, text data, and/or or voice data. Because the type of data may be inferred, the encrypted stream of packets may be processed to achieve objectives and goals. That is, even though the contents of the packets are hidden by encryption, this invention can still identify the type of date contained within the packets. The inferred type of data may then be used to determine if additional processing is required.

According to an exemplary embodiment, the presence of Voice Over Internet Protocol data may be detected. Voice Over Internet Protocol communications are often encrypted to increase privacy. Although this encryption increases privacy, encryption also obscures quality of service indicators. These quality of service indicators are used by service providers to ensure packets are processed for acceptable voice quality. When the quality of service indicators are obscured by encryption, the encrypted packets do not receive priority that voice calls require. That is, the encrypted packets are not prioritized, and thus packets are lost and congestion introduces latency. These lost and late packets can make the connection unacceptable for Internet telephony.

According to an exemplary embodiment, although encryption obscures the contents of the packets, one or more observable parameters that are characteristic of Voice Over Internet Protocol data may be used to infer whether Voice Over Internet Protocol data is actually present. So, even though the contents of the packets are hidden by encryption, the packets can still be prioritized to ensure acceptable voice quality.

Figure 1:
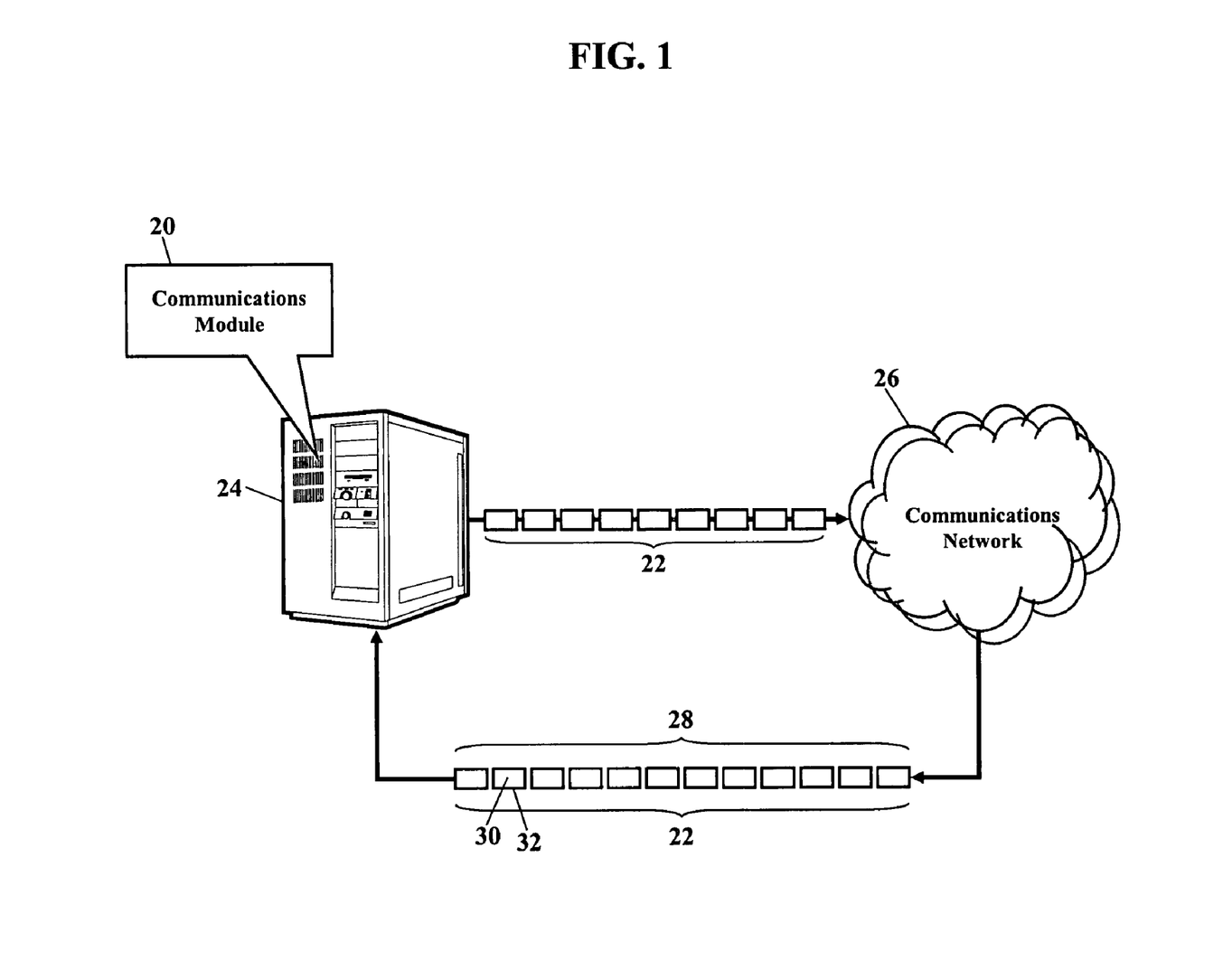
FIG. 1 is a schematic illustrating exemplary embodiments.

FIG. 1 is a schematic illustrating exemplary embodiments. According to an exemplary embodiment, a communications module 20 comprises methods, systems, computer programs, and/or computer program products that help provide communications services. The communications module 20, in particular, detects an encrypted stream 22 of Internet Protocol packets. The communications module 20 operates within any computer system, such as a communications server 24. The communications module 20 receives the encrypted stream 22 of packets via a communications network 26. The communications network 26 may be a cable network operating in the radio-frequency domain and/or the Internet Protocol (IP) domain. The communications network 26, however, may also include a distributed computing network, such as the Internet (sometimes alternatively known as the "World Wide Web"), an intranet, a local-area network (LAN), and/or a wide-area network (WAN). The communications network 26 may include coaxial cables, copper wires, fiber optic lines, and/or hybrid-coaxial lines. The communications network 26 may even include wireless portions utilizing any portion of the electromagnetic spectrum and any signaling standard (such as the various cellular standards CDMA, TDMA, GSM, and/or the I.E.E.E. 802 family of standards). Because the stream 22 of packets is encrypted, the encryption obscures the contents of the stream 22 packets. The communications module 20, however, is able to discern an observable parameter 28 of the encrypted stream 22 of packets. The communications module 20 is able to observe the parameter 28, despite encryption obscuring the contents 30 of each packet 32 within the stream 22 of packets. As the following paragraphs explain, the communications module 20 uses the observable parameter 28 to infer the type of data contained within the contents 30 of each packet 32 within the stream 22 of packets. Because the communications module 20 can infer the type of data contained within the stream 22 of packets, the communications module 20 can apply special processing techniques to the stream 22 of packets, if needed, despite the encryption obscuring the contents 30 of each packet 32.

Figure 2:
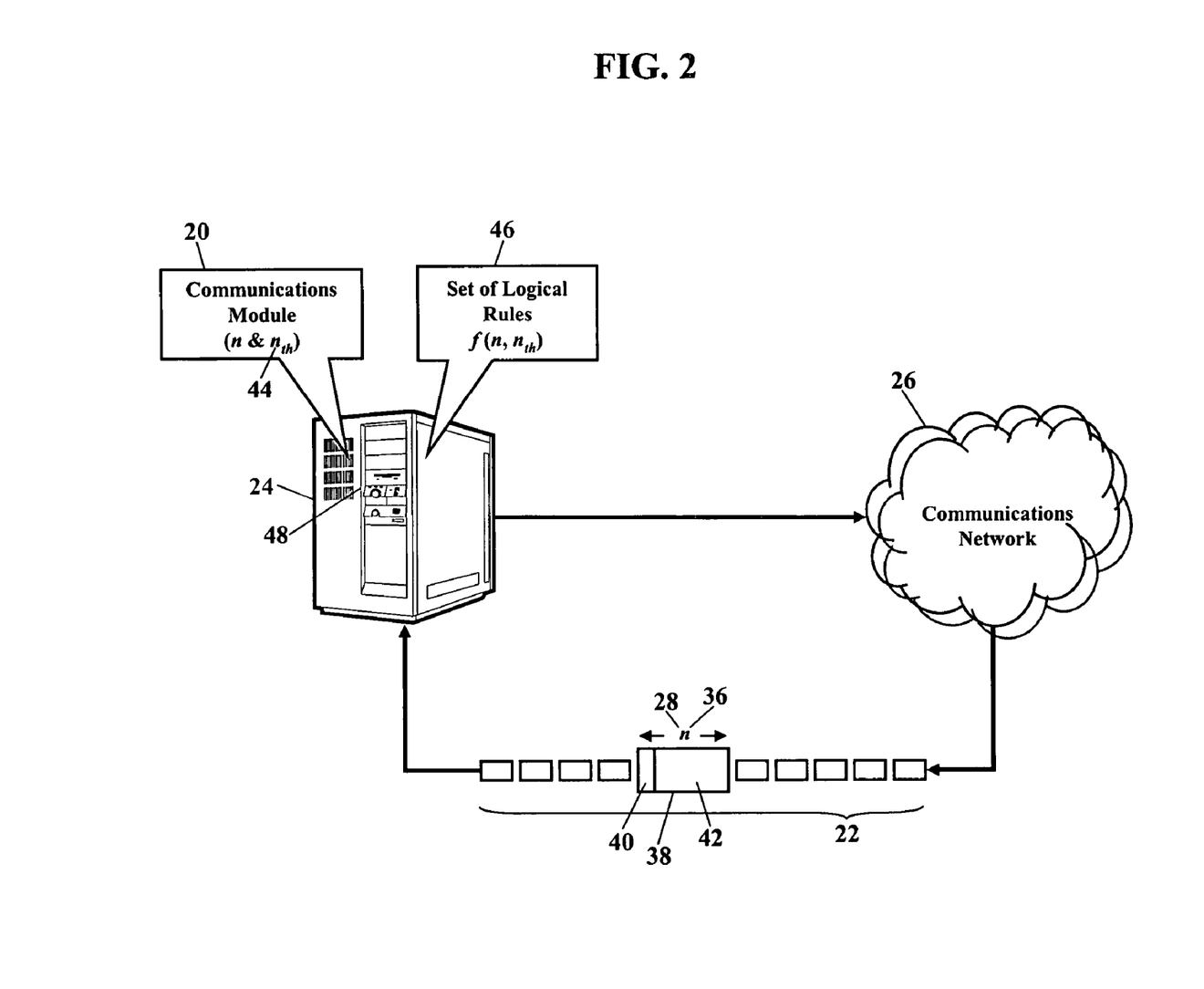
FIGS. 2 and 3 are schematics illustrating an observable parameter, according to the exemplary embodiments.
Figure 3:
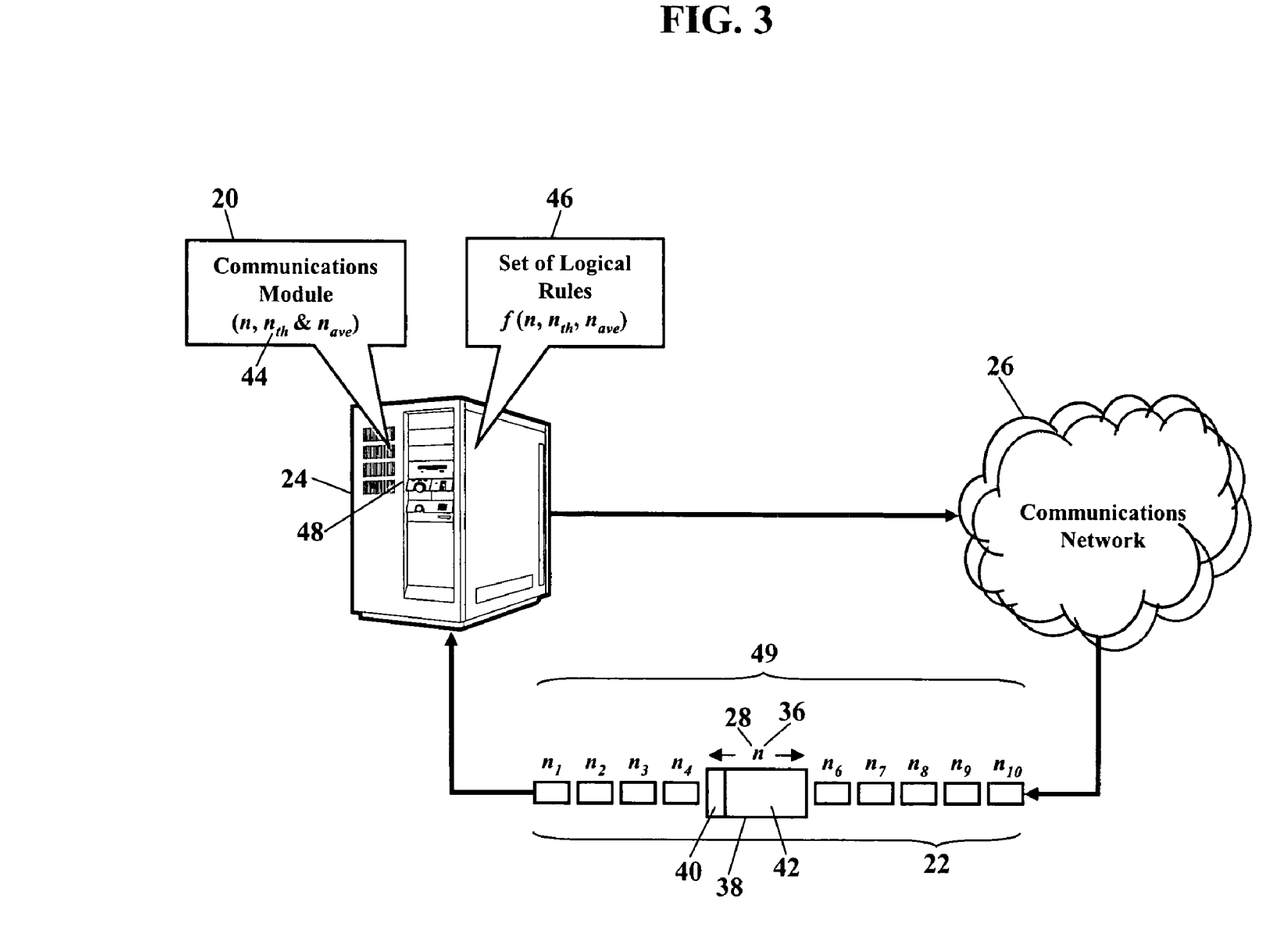

FIGS. 2 and 3 are schematics illustrating an exemplary observable parameter 28, according to the exemplary embodiments. Here the exemplary observable parameter 28 is a bit size n (shown as reference numeral 36) of an encrypted packet 38 within the stream 22 of packets. The communications module 20 receives the encrypted stream 22 of packets. Because the stream 22 of packets is encrypted, the encryption obscures the contents of the stream 22 packets. The communications module 20, however, is able to note the size n (shown as reference numeral 36) of an encrypted packet 38 within the stream 22 of packets. The encrypted packet 38 is shown enlarged for clarity. That is, although encryption obscures the contents of the packet 38, the communications module 20 is still able to note a bit size and/or length of the encrypted packet 38. The size n of the encrypted packet 38 may be divided between a header portion 40 and a payload portion 42. The communications module 20 is able to discern, read, observe, measure, or otherwise note the bit size and/or length of the packet 38, the header portion 40, and/or the payload portion 42.

The communications module 20 may then compare the size n of the encrypted packet 38. The communications module 20 may measure the size n of the encrypted packet 38, and then use the size n to determine what type of data is contained within the encrypted packet 38. The communications module 20, for example, may compare the size n of the encrypted packet 38 to a threshold packet size $n_{th}$ (shown as reference numeral 44) or, alternatively, to a range of sizes for the packets. The threshold packet size $n_{th}$, or alternately the range of packet sizes, describes a known packet size of a known type of data. The threshold packet size $n_{th}$, for example, might be a known value for packets containing video data, text file data, picture data, and/or any other known type of data. If the packet size n satisfies the threshold packet size $n_{th}$, then the communications module 20 can infer the type of data contained within the encrypted packet 38 matches the known type of data corresponding to the threshold packet size $n_{th}$.

The communications module 20 may even consult a set of logical rules. As FIG. 2 shows, the communications module 20 may consult a set 46 of logical rules stored in a memory 48 of the communications server 24. The set 46 of logical rules could contain some mathematical expression and/or algorithm involving the packet size n and/or the threshold packet size $n_{th}$. The result of this mathematical expression/algorithm could help the communications module 20 infer the type of data contained within the encrypted packet 38. If, for example, the packet size n equals or exceeds a minimum threshold packet size $n_{th-min}$, then the communications module 20 may infer that the type of data contained within the encrypted packet 38 matches the known type of data corresponding to the threshold packet size $n_{th}$. If, however, the packet size n is less than the minimum threshold packet size $n_{th-min}$, then the communications module 20 may decline to infer the type of data contained within the encrypted packet 38. Conversely, for example, if the packet size n equals or exceeds a maximum threshold packet size $n_{th-max}$, then the Communications Module 20 may decline to infer that the type of data contained within the encrypted packet 38 matches the known type of data corresponding to the threshold packet size $n_{th}$. If, however, the packet size n is less than the maximum threshold packet size $n_{th-max}$, then the Communications Module 20 may infer the type of data contained within the encrypted packet 38. Note that expected packet sizes and packet size ranges may also be used to determine whether to infer or decline to infer, such that if the measured value matches the expected value or lies within the expected range, the inference is made, while if the measured value does not match the expected value or lies outside the expected range, the inference is declined. The set 46 of logical rules could contain any mathematical expression/algorithm that may help the communications module 20 infer the type of data contained within the encrypted packet 38.

FIG. 3 further illustrates an exemplary observable parameter 28, according to exemplary embodiments. Here the exemplary observable parameter 28 may be the size $n_i$ of each encrypted packet, the threshold packet size $n_{th}$, and/or a computed average packet size $n_{ave}$ for an entire series 49 of packets. As FIG. 3 shows, the stream 22 of packets may contain the series 49 of packets, and the communications module 20 may measure the size $n_i$ of each encrypted packet within the series 49 of packets. The communications module 20 may compare the size $n_i$ of each encrypted packet to the threshold packet size $n_{th}$ (shown as reference numeral 44). The communications module 20 may alternatively or additionally compute an average packet size $n_{ave}$ for the series 49 of packets, and the communications module 20 may compare the average packet size $n_{ave}$ to the threshold packet size $n_{th}$. The communications module 20 could consult the set 46 of logical rules for any mathematical expression/algorithm involving the size $n_i$ of each encrypted packet, the average packet size $n_{ave}$, and/or the threshold packet size $n_{th}$. The communications module 20 may then infer the type of data contained within the series 49 of packets.

Figure 4:
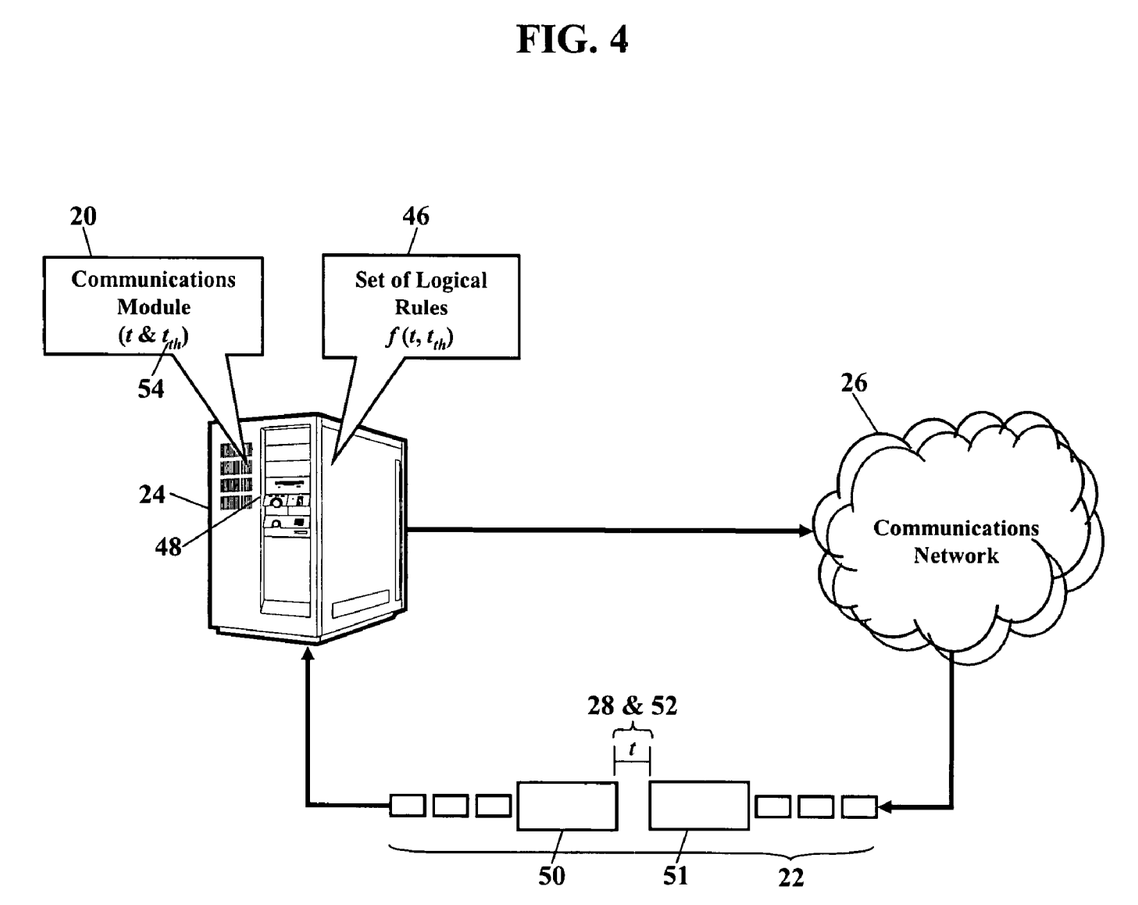
FIGS. 4 and 5 are schematics illustrating another observable parameter, according to more embodiments.
Figure 5:
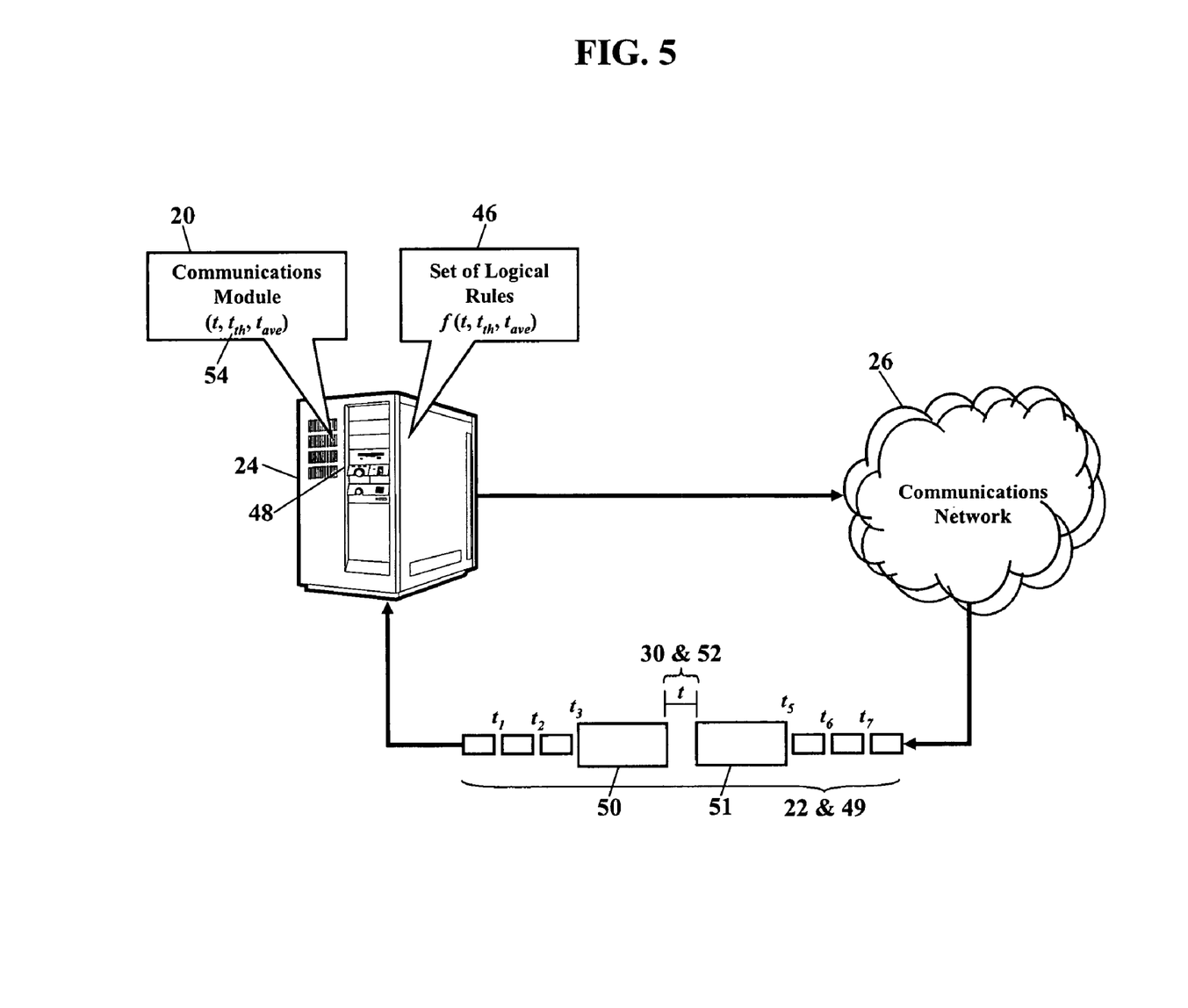

FIGS. 4 and 5 are schematics illustrating another observable parameter 28, according to more embodiments. Here the observable parameter 28 is a timing interval t between adjacent encrypted packets. The communications module 20, as before, receives the encrypted stream 22 of packets. Because the stream 22 of packets is encrypted, the encryption obscures the contents of the stream 22 packets. The communications module 20, however, is able to note the timing interval t between adjacent encrypted packets 50 and 51 (the timing interval t is shown as reference numeral 52). The adjacent encrypted packets 50, 51 and the timing interval t are shown enlarged for clarity. Although encryption obscures the contents of the adjacent packets 50 and 51, the communications module 20 is still able to discern, read, observe, measure, or otherwise note the timing interval t between the adjacent encrypted packets 50 and 51.

The communications module 20 may then compare the timing interval t. The communications module 20 may measure the timing interval t, and then use the timing interval t to determine what type of data is contained within the adjacent packets 50 and 51 and/or the encrypted stream 22 of packets. The communications module 20, for example, may compare the timing interval t to a threshold timing interval $t_{th}$ (shown as reference numeral 54) or, alternately, a range of timing intervals. The threshold timing interval $t_{th}$ or, alternately, the range of timing intervals, describes a known timing interval of a known type of data. The threshold timing interval $t_{th}$, for example, might be a known value for adjacent packets containing video data, text file data, audio data, picture data, and/or any other known type of data. If the timing interval t satisfies the threshold timing interval $t_{th}$, then the communications module 20 can infer the type of data contained within the adjacent packets 50 and 51 matches the known type of data corresponding to the threshold timing interval $t_{th}$.

The communications module 20 may also consult the set 46 of logical rules. The set 46 of logical rules could contain some mathematical expression and/or algorithm involving the timing interval t and/or the threshold timing interval $t_{th}$. The result of this mathematical expression/algorithm could help the communications module 20 infer the type of data contained within the adjacent packets 50 and 51. If, for example, the timing interval t equals or exceeds the minimum threshold timing interval $t_{th-min}$, then the communications module 20 may infer that the type of data contained within the adjacent packets 50 and 51 matches the known type of data corresponding to the minimum threshold timing interval $t_{th-min}$. If, however, the timing interval t is less than the minimum threshold timing interval $t_{th-min}$, then the communications module 20 may decline to infer the type of data contained within the adjacent packets 50 and 51. Conversely, for example, if the timing interval t equals or exceeds a maximum threshold timing interval $t_{th-max}$, then the Communications Module 20 may decline to infer that the type of data contained within the adjacent packets 50 and 51 matches the known type of data corresponding to the threshold timing interval $t_{th-max}$. If, however, the timing interval t is less than the maximum threshold timing interval $t_{th,max}$, then the Communications Module 20 may infer the type of data contained within the adjacent packets 50 and 51. Note that expected timing intervals and timing interval ranges may also be used to determine whether to infer or decline to infer, such that if the measured value matches the expected value or lies within the expected range, the inference is made, while if the measured value does not match the expected value or lies outside the expected range, the inference is declined. The set 46 of logical rules could contain any mathematical expression/algorithm that may help the communications module 20 infer the type of data contained within the adjacent packets 50 and 51.

FIG. 5 further illustrates an exemplary observable parameter 28, according to exemplary embodiments. Here the observable parameter 28 may include the timing interval $t_i$ between adjacent packets, the threshold timing interval $t_{th}$, and/or a computed average timing interval $t_{ave}$ for the series 49 of packets. As FIG. 5 illustrates, the communications module 20 may compare the timing interval $t_i$ between adjacent packets within the series 49 of packets. The communications module 20 may then compare one or more of the timing intervals $t_i$ to the threshold timing interval $t_{th}$. The communications module 20 may alternatively or additionally compute an average timing interval $t_{ave}$ for the series 49 of packets, and the communications module 20 may compare the average timing interval $t_{ave}$ to the threshold timing interval $t_{th}$. The communications module 20 could consult the set 46 of logical rules for any mathematical expression/algorithm involving the timing intervals $t_i$, the average timing interval $t_{ave}$, and/or the threshold timing interval $t_{th}$. The communications module 20 may then infer the type of data contained within the series 49 of packets.

Figure 6:
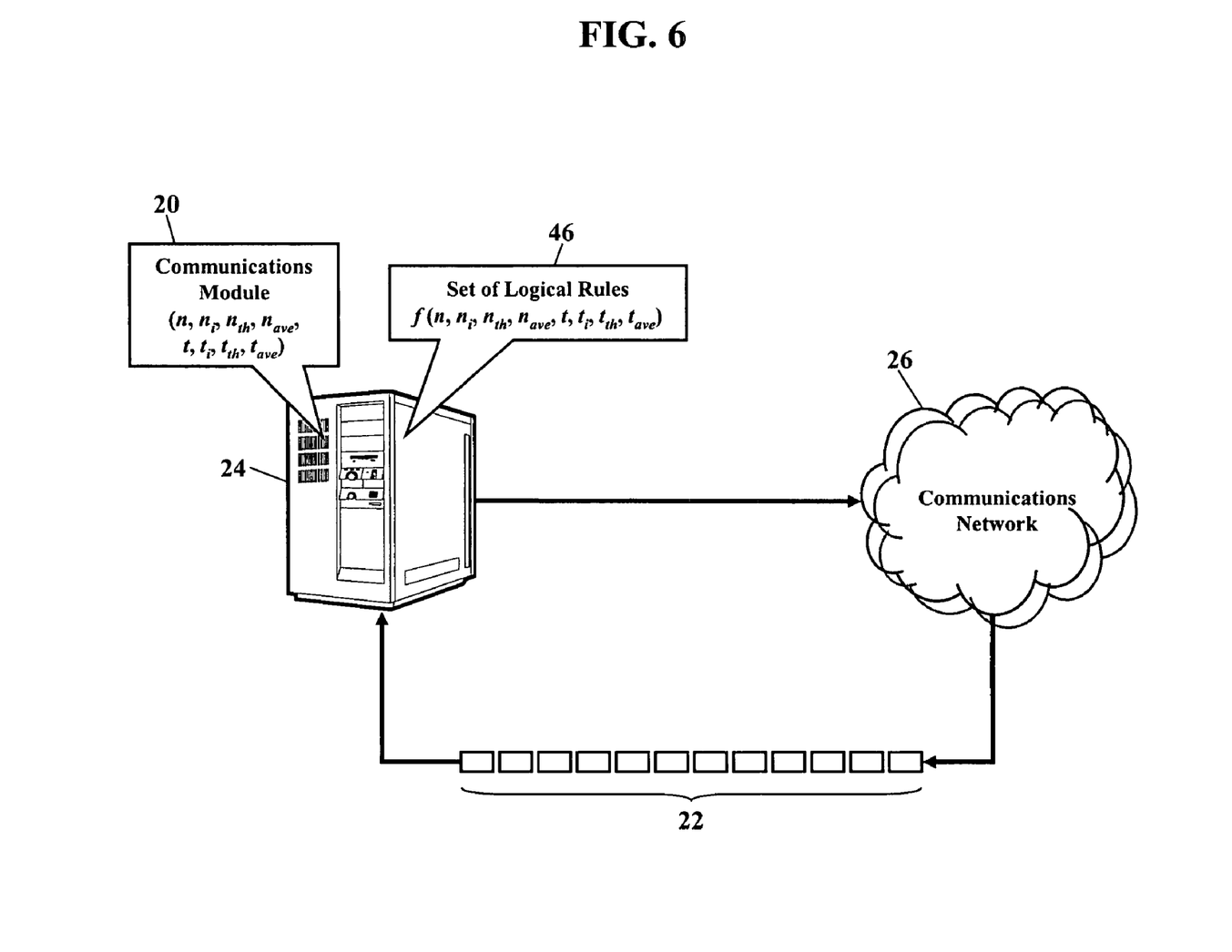
FIG. 6 is a schematic further illustrating the set of logical rules, according to more embodiments.

FIG. 6 is a schematic further illustrating a set of logical rules, according to more embodiments. The set 46 of logical rules may contain some mathematical expression and/or algorithm involving the size $n_i$ of each encrypted packet, the threshold packet size $n_{th}$, the average packet size $n_{ave}$, the timing interval t, the threshold timing interval $t_{th}$, and/or the average timing interval $t_{ave}$. The result of this mathematical expression/algorithm could help the communications module 20 infer the type of data contained within the encrypted stream 22 of packets.

Figure 7:
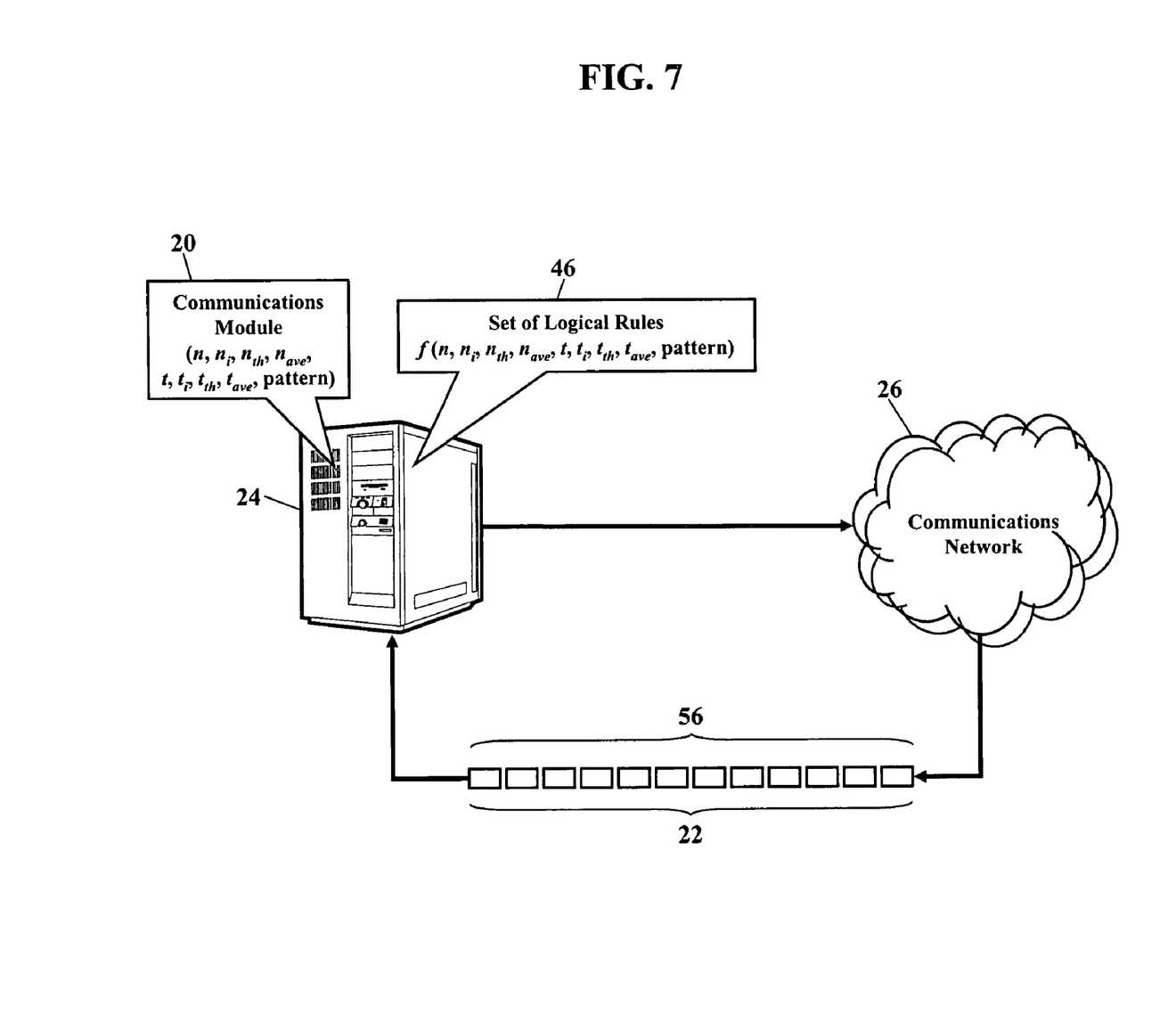
FIG. 7 is a schematic illustrating another observable parameter, according to more embodiments.

FIG. 7 is a schematic illustrating another observable parameter, according to more exemplary embodiments. Here the observable parameter 28 is a pattern 56 within the encrypted stream 22 of packets. The communications module 20 may measure, recognize, discern, read, observe, or otherwise note the recognizable pattern 56 within the encrypted stream 22 of packets. The pattern 56 may involve, in any combination, any of the observable parameters, such as the size $n_i$ of each encrypted packet, the threshold packet size $n_{th}$, the minimum threshold packet size $n_{th-min}$, the maximum threshold packet size $n_{th-max}$, the average packet size $n_{ave}$, and/or a range of packet sizes. The pattern 56 may involve, in any combination, the timing interval t, the threshold timing interval $t_{th}$, the minimum threshold timing interval $t_{th-min}$, the maximum threshold timing interval $t_{th-max}$, the average timing interval $t_{ave}$, and/or a range of timing intervals. The pattern 56 may additionally or alternatively involve a constant, or nearly constant, packet size $n_i$ within the stream 22 of packets. The pattern 56 may additionally or alternatively involve a constant, or nearly constant, timing interval $t_i$ between adjacent packets within the stream 22 of packets. The pattern 56 may additionally or alternatively involve a constant, or nearly constant, presence of transmitted packets from a particular originating communications device and/or address, or from a particular set of same. The pattern 56 may additionally or alternatively involve a constant, or nearly constant, presence of packets destined to a particular terminating communications device and/or address, or to a particular set of same. The pattern 56 may additionally or alternatively involve recognizable/repeating periods of packets interspersed with recognizable/repeating periods of no packets. Some originating communications devices and/or addresses may generate so much traffic that the type of data within the stream 22 of packets is automatically inferred (such as voice data). Some terminating communications devices and/or addresses, likewise, may receive so much traffic that the type of data within the stream 22 of packets is automatically inferred. Whatever the pattern 56 may indicate, the communications module 20 is able to note the pattern 56 and infer the type of data within the stream 22 of packets.

Figure 8:
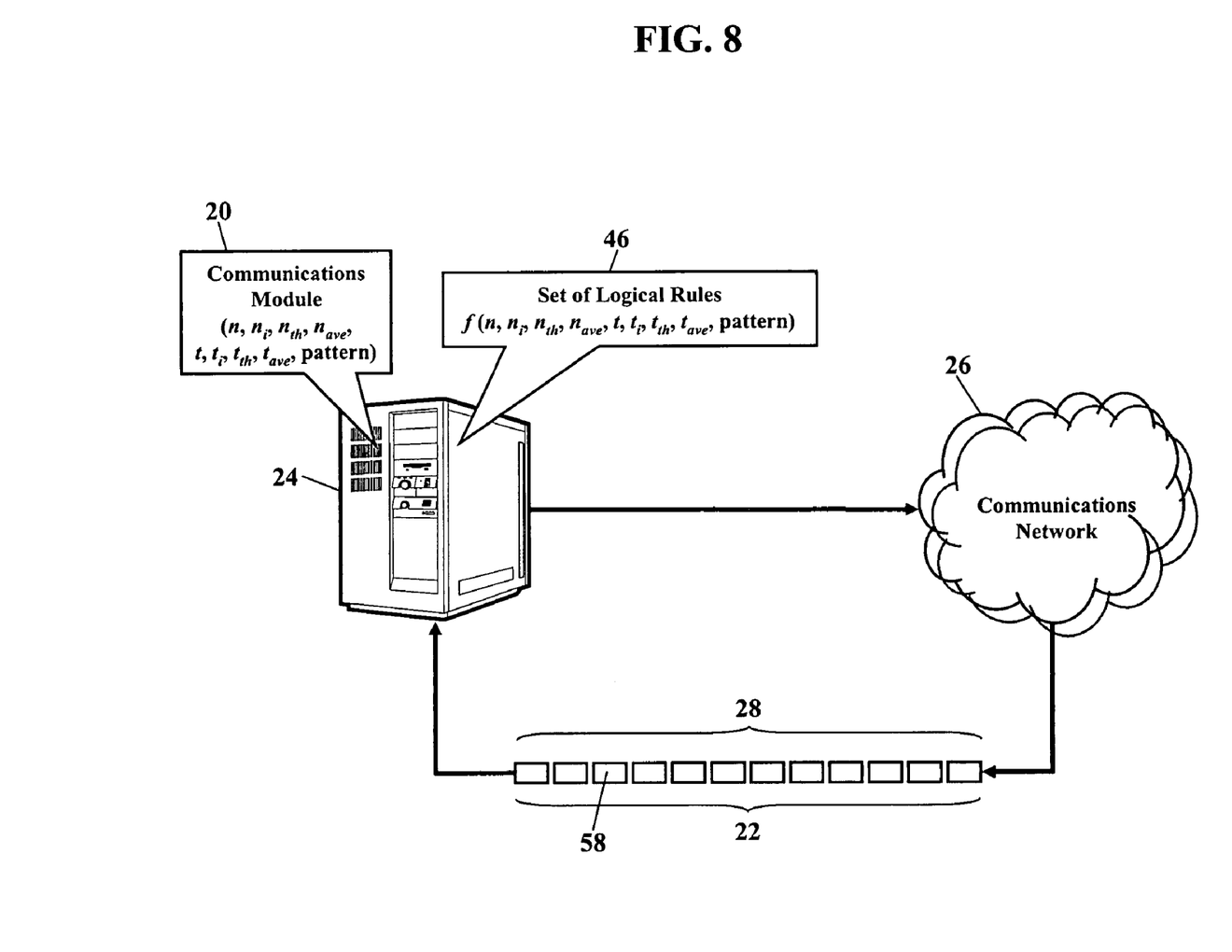
FIG. 8 is a schematic showing inference of Voice Over Internet Protocol data.

FIG. 8 is a schematic showing inference of Voice Over Internet Protocol data according to an exemplary embodiment. Here the communications module 20 is able to note the observable parameter 28 within the encrypted stream 22 of packets. The communications module 20 compares the observable parameter 28 to one or more threshold values or ranges. The communications module 20 may then use the result of the comparison to infer the encrypted stream 22 of packets contains Voice Over Internet Protocol (VoIP) data 58. The communications module 20, therefore, may infer the encrypted stream 22 of packets contains the Voice Over Internet Protocol data 58, despite the encryption.

Because the communications module 20 can infer the Voice Over Internet Protocol data 58, processing is improved. The Voice Over Internet Protocol data 58 may require different processing steps/treatments to help ensure quality of service. That is, if the encrypted stream 22 of packets contains the Voice Over Internet Protocol data 58, the encrypted stream 22 might require higher priority treatment to help ensure that the quality of the Internet Protocol telephone call is within acceptable standards. If, for example, packets are delayed such that excess latency is introduced, the encrypted stream 22 of packets will have poor (or even unacceptable) quality for a telephone call. The communications module 20, however, notes and compares the observable parameter 28 to infer the Voice Over Internet Protocol data 58 and, thus, apply processing that helps ensure quality of service. Even though the communications module 20 cannot read the contents of the encrypted stream 22, the communications module 20 can exploit the characteristics of the connection to ensure quality of service. Once the communications module 20 infers that the Voice Over Internet Protocol data 58 is present, the communications module 20 can prioritize the encrypted stream 22 for any processing steps that help ensure the encrypted stream 22 is acceptable for voice quality.

Voice Over Internet Protocol traffic has recognizable characteristics, despite encryption. When, for example, the encrypted stream 22 contains the Voice Over Internet Protocol data 58, the encrypted stream 22 has a relatively constant packet size and inter-packet timing. The communications module 20, then, notes and compares the size $n_i$ of each encrypted packet and the timing interval $t_i$ between adjacent packets. When the communications module 20 compares to the known threshold values $n_{th}$ and $t_{th}$ describing Voice Over Internet Protocol packets, the communications module 20 is able to infer that enhanced processing is desired. If the size $n_i$ of each encrypted packet and the timing interval $t_i$ between adjacent packets compares unfavorably to the known threshold values $n_{th}$, and $t_{th}$, the communications module 20 defaults to a lesser, "best effort" quality of service.

Voice Over Internet Protocol traffic has other recognizable characteristics, despite encryption. Voice Over Internet Protocol traffic may be recognized by a relatively constant presence of transmitted packets from an originating communications device and/or address. Voice Over Internet Protocol traffic may also be recognized by a constant, or nearly constant, presence of packets destined for a terminating communications device and/or address. Voice Over Internet Protocol traffic may also be recognized by a relatively constant presence of packets interspersed with "silence" periods, which may correspond generally to times when a human user is listening rather than talking. These silence periods might be periods of little or no packets. These silence periods might additionally or alternatively be periods of packets having small or no payloads.

Figure 9:
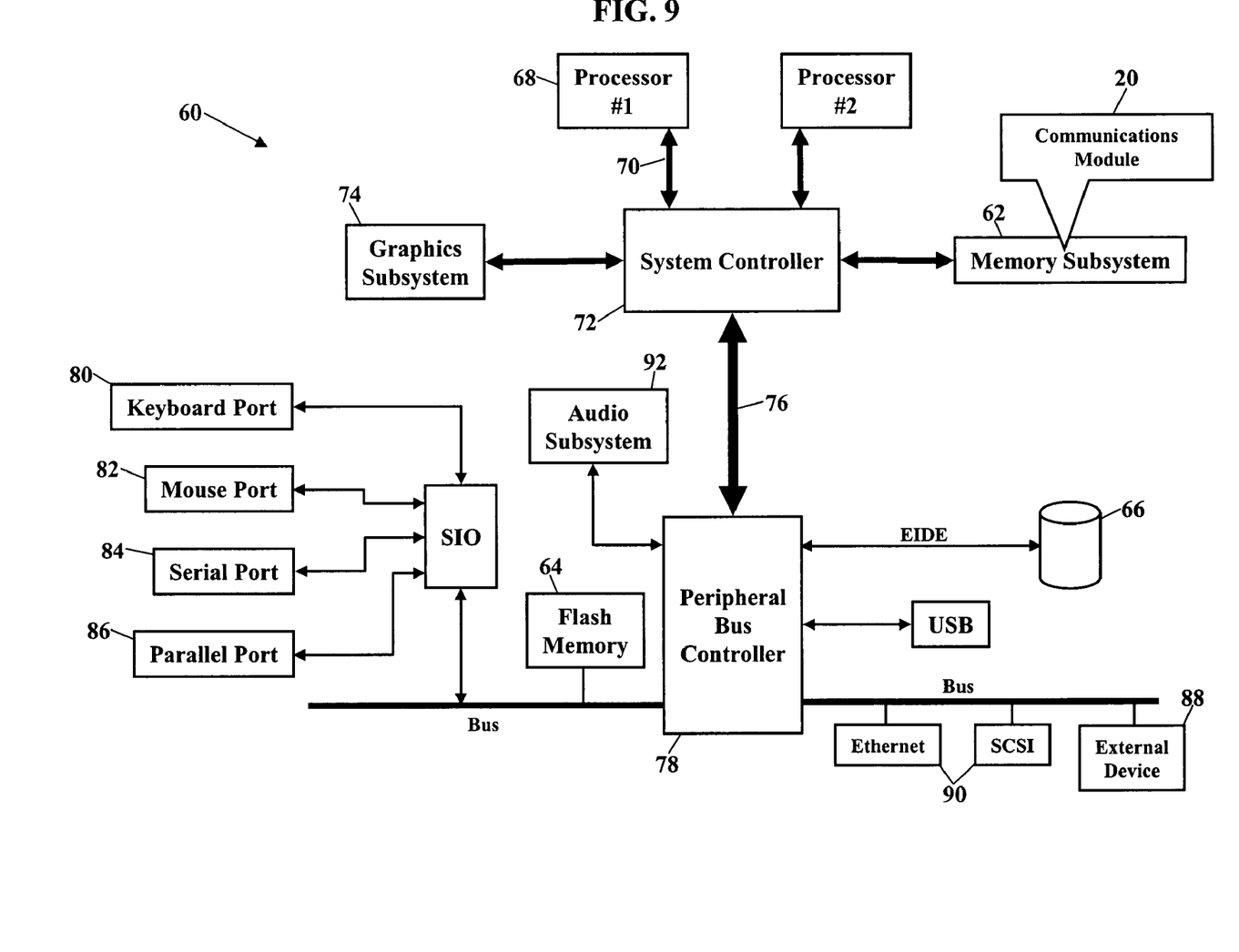
FIG. 9 is a block diagram showing a communications module residing in a computer system, according to yet more embodiments.

FIG. 9 depicts another possible operating environment for exemplary embodiments. FIG. 9 is a block diagram showing the communications module 20 residing in a computer system 60. The computer system 60 may be any computing system, such as the communications server (shown as reference numeral 24 in FIGS. 1-8), an IP network element such as an IP router/switch/hub/gateway/proxy, or any other computer device. As FIG. 9 shows, the communications module 20 operates within a system memory device. The communications module 20, for example, is shown residing in a memory subsystem 62. The Communications Module 20, however, could also reside in flash memory 64 or a peripheral storage device 66, or in firmware or hardware, or in any combination. The computer system 60 also has one or more central processors 68 executing an operating system. The operating system, as is well known, has a set of instructions that control the internal functions of the computer system 60. A system bus 70 communicates signals, such as data signals, control signals, and address signals, between the central processor 68 and a system controller 72 (typically called a "Northbridge"). The system controller 72 provides a bridging function between the one or more central processors 68, a graphics subsystem 74, the memory subsystem 62, and a PCI (Peripheral Controller Interface) bus 76. The PCI bus 76 is controlled by a Peripheral Bus Controller 78. The Peripheral Bus Controller 78 (typically called a "Southbridge") is an integrated circuit that serves as an input/output hub for various peripheral ports. These peripheral ports are shown including a keyboard port 80, a mouse port 82, a serial port 84 and/or a parallel port 86 for a video display unit, one or more external device ports 88, and networking ports 90 (such as SCSI or Ethernet). The Peripheral Bus Controller 78 also includes an audio subsystem 92. Those of ordinary skill in the art understand that the program, processes, methods, and systems described in this patent are not limited to any particular computer system or computer hardware.

Those of ordinary skill in the art also understand the central processor 68 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, the amd.com URL). The Intel Corporation also manufactures a family of X86 and P86 microprocessors (Intel Corporation, 2200 Mission College Blvd., Santa Clara, Calif. 95052-8119, 408.765.8080, the intel.com URL). Other manufacturers also offer microprocessors. Such other manufacturers include Motorola, Inc. (1303 East Algonquin Road, P.O. Box A3309 Schaumburg, Ill. 60196, the Motorola.com URL), International Business Machines Corp. (New Orchard Road, Armonk, N.Y. 10504, (914) 499-1900, the ibm.com URL), and Transmeta Corp. (3940 Freedom Circle, Santa Clara, Calif. 95054, the transmeta.com URL). Those skilled in the art further understand that the program, processes, methods, and systems described herein are not limited to any particular manufacturer's central processor.

A preferred operating system, according to an exemplary embodiment, is the UNIX® operating system (UNIX® is a registered trademark of the Open Source Group, the opensource.org URL). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, the redhat.com URL). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, the Microsoft.com URL). and Mac® OS (Mac® is a registered trademark of Apple Computer, Inc., 1 Infinite Loop, Cupertino, Calif. 95014, 408.996.1010, the apple.com URL). Example operating systems of IP network elements including IP routers/switches/hubs/gateways/proxies include Cisco IOS (Internet Operating System), Vxworks, various proprietary OS's, and variations of UNIX. Those of ordinary skill in the art again understand that the program, processes, methods, and systems described herein are not limited to any particular operating system.

The system memory device (shown as memory subsystem 62, flash memory 64, or peripheral storage device 66) may also contain an application program. The application program cooperates with the operating system and with a video display unit (via the serial port 84 and/or the parallel port 86) to provide a Graphical User Interface (GUI). The Graphical User Interface typically includes a combination of signals communicated along the keyboard port 80 and the mouse port 82. The Graphical User Interface provides a convenient visual and/or audible interface with a user of the computer system 60.

Figure 10:
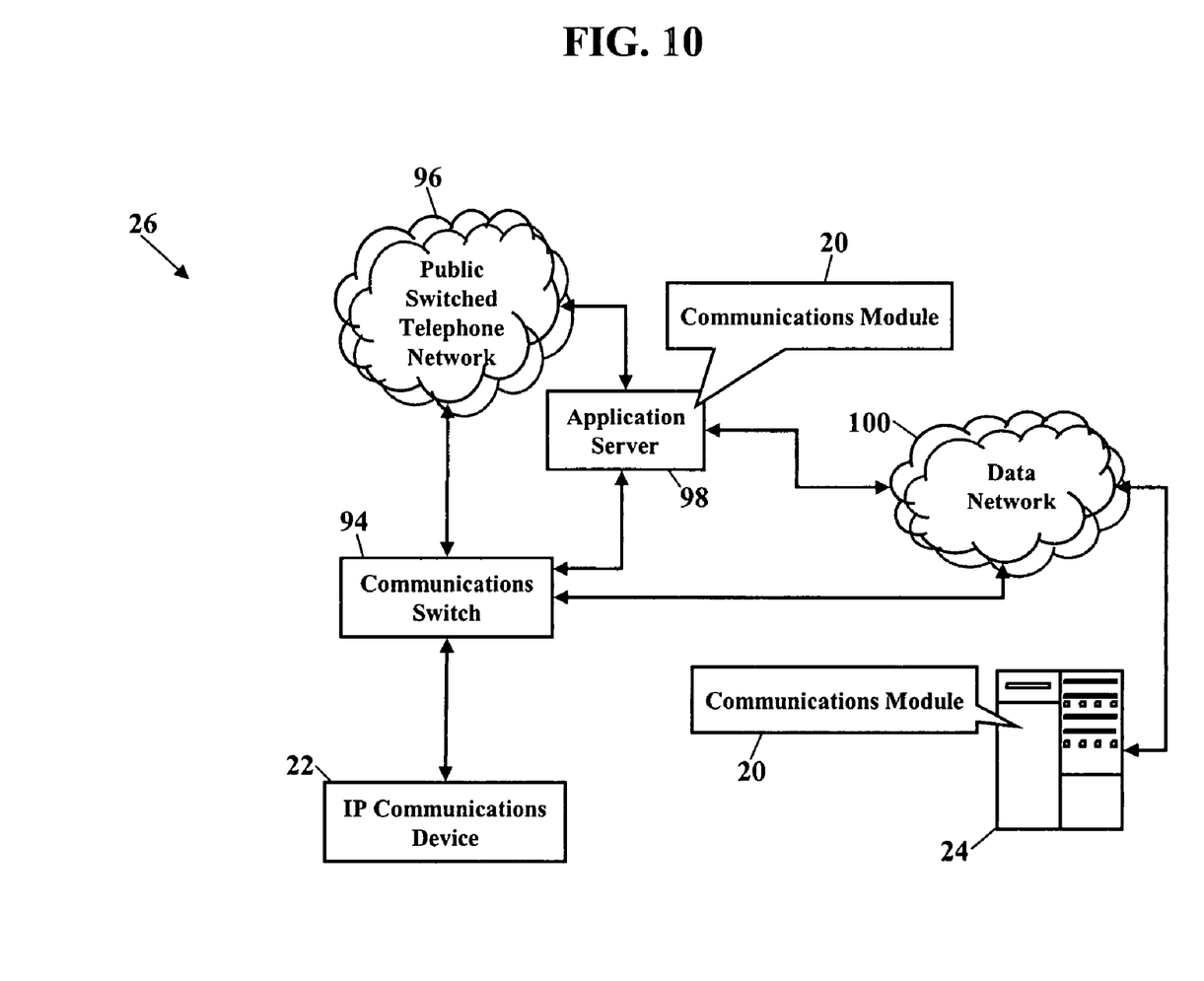
FIG. 10 is a schematic showing the communications module operating within a packetized communications network, according to still more embodiments.

FIG. 10 illustrates yet another possible operating environment according to exemplary embodiments. FIG. 10 is a schematic showing the communications module 20 operating within the packetized communications network 26. The communications network 26 includes a communications switch 94 of a Public Switched Telephone Network 96. The communications switch 94 is a packet-based "softswitch." This softswitch uses software control to provide voice, data, and video services by dynamically changing its connection data rates and protocols types. An application server 98 interfaces with the softswitch via a packet protocol, such as Session Initiation Protocol (SIP). The application server 98 and the communications switch 94 also interfaces with a data network 100. This application server 98 includes voice service protocols, triggers, and/or operations that allow the Public Switched Telephone Network 96 and the data network 100 to interoperate.

The communications module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the communications module to be easily disseminated. A computer program product for detecting the type of data contained within an encrypted stream of packets includes the communications module stored on the computer-readable medium. The communications module notes an observable parameter of an encrypted stream of packets. The parameter is observable despite encryption obscuring the contents of the encrypted stream of packets. The communications module compares the observable parameter to a threshold value. If the observable parameter favorably compares to the threshold value, the communications module infers Voice Over Internet Protocol data is present within the encrypted stream of packets, despite the encryption.

The communications module may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

While exemplary embodiments of the present invention have been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method carried out using a processor circuit, comprising:

detecting an observable parameter of an encrypted stream of packets, the parameter being observable despite encryption obscuring the contents of the encrypted stream of packets, wherein the observable parameter is observed without decrypting any portion of the stream of packets; and estimating the type of data within the encrypted stream of packets from the observable parameter, wherein, despite the encryption, the type of data within the encrypted stream of packets may be estimated, wherein the type of data is estimated without decrypting any portion of the stream of packets.

2. A method according to claim 1, wherein detecting the observable parameter comprises at least one of i) measuring a size of an encrypted packet, ii) measuring a timing interval between encrypted packets, and iii) detecting a pattern of packets.

3. A method according to claim 2, further comprising at least one of i) comparing to an expected packet size, ii) comparing to a minimum threshold packet size, iii) comparing to a maximum threshold packet size, and iv) comparing to a threshold range of packet sizes.

4. A method according to claim 3, further comprising at least one of i) if the observable parameter equals the threshold, then estimating the type of data within the encrypted stream of packets; ii) if the observable parameter exceeds the threshold, then estimating the type of data within the encrypted stream of packets; and iii) if the observable parameter is less than the threshold, then declining to estimate the type of data within the encrypted stream of packets.

5. A method according to claim 2, further comprising at least one of i) comparing to an expected timing interval, ii) comparing to a minimum threshold timing interval, iii) comparing to a maximum threshold timing interval, and iv) comparing to a threshold range of timing intervals.

6. A method according to claim 1, wherein detecting the observable parameter comprises at least one of i) computing an average timing interval within the encrypted stream of packets and ii) computing an average packet size within the encrypted stream of packets.

7. A method according to claim 1, wherein the encrypted stream of packets comprises Voice Over Internet Protocol data, and estimating the type of data within the encrypted stream of packets comprises estimating the Voice Over Internet Protocol data from the observable parameter, wherein, despite the encryption, the Voice Over Internet Protocol data within the encrypted stream of packets may be estimated.

8. A method according to claim 1 wherein the observable parameter is outside the encrypted stream of packets.

9. A system, comprising:

a communications module stored in a memory device, and a processor communicating with the memory device;

the communications module detecting an observable parameter of an encrypted stream of packets, the parameter being observable despite encryption obscuring the contents of the encrypted stream of packets, wherein the observable parameter is observed without decrypting any portion of the stream of packets, the communications module comparing the observable parameter to a threshold value, and the communications module estimating the type of data within the encrypted stream of packets from the observable parameter, wherein, despite the encryption, the type of data within the encrypted stream of packets may be estimated without decrypting any portion of the stream of packets.

10. A system according to claim 9, wherein the communications module performs at least one of the following steps: i) measures a size of an encrypted packet, ii) measures a timing interval between encrypted packets, and iii) detects a pattern of packets.

11. A system according to claim 9, wherein the communications module compares the observable parameter to a threshold value.

12. A system according to claim 11, wherein the communications module performs at least one of the following: i) if the observable parameter equals the threshold value, then the communications module estimates the type of data within the encrypted stream of packets; ii) if the observable parameter exceeds the threshold value, then the communications module estimates the type of data within the encrypted stream of packets; and iii) if the observable parameter is less than the threshold value, then the communications module declines to estimate the type of data within the encrypted stream of packets.

13. A system according to claim 9, wherein the stream of packets comprises Internet Protocol packets.

14. A system according to claim 9, wherein the communications module performs at least one of the following: i) computes an average timing interval within the encrypted stream of packets; ii) computes an average packet size within the encrypted stream of packets; and iii) if the encrypted stream of packets comprises Voice Over Internet Protocol data, then the communications module estimates the Voice Over Internet Protocol data from the observable parameter, wherein, despite the encryption, the Voice Over Internet Protocol data within the encrypted stream of packets may be estimated.

15. A system according to claim 9 wherein the observable parameter is outside the encrypted stream of packets.

16. A computer program product comprising a non-transitory computer readable medium including instructions for performing the steps:
  detecting an observable parameter of an encrypted stream of packets, the parameter being observable despite encryption obscuring the contents of the encrypted stream of packets, wherein the observable parameter is observed without decrypting any portion of the stream of packets; and
  estimating the type of data within the encrypted stream of packets from the observable parameter, wherein, despite the encryption, the type of data within the encrypted stream of packets may be estimated, wherein the type of data is estimated without decrypting any portion of the stream of packets.

17. A computer program product according to claim 16, wherein the instructions also perform at least one of i) measuring a size of an encrypted packet, ii) measuring a timing interval between encrypted packets, and iii) detecting a pattern of packets.

18. A computer program product according to claim 16, wherein the instructions also perform comparing the observable parameter to a threshold value.

19. A computer program product according to claim 18, wherein the instructions also perform at least one of the steps: i) if the observable parameter equals the threshold value, then estimating the type of data within the encrypted stream of packets; ii) if the observable parameter exceeds the threshold value, then estimating the type of data within the encrypted stream of packets; and iii) if the observable parameter is less than the threshold value, then declining to estimate the type of data within the encrypted stream of packets.

20. A computer program product according to claim 16, wherein the stream of packets comprises Internet Protocol packets.

21. A computer program product according to claim 16, wherein the instructions also perform at least one of: i) computing an average timing interval within the encrypted stream of packets and ii) computing an average packet size within the encrypted stream of packets.

22. A computer program product according to claim 16, wherein if the encrypted stream of packets comprises Voice Over Internet Protocol data, then the instructions estimate the Voice Over Internet Protocol data from the observable parameter, wherein, despite the encryption, the Voice Over Internet Protocol data within the encrypted stream of packets may be estimated.

23. A computer program product according to claim 16 wherein the observable parameter is outside the encrypted stream of packets.

\* \* \* \* \*